United States Patent
Yavuz et al.

(10) Patent No.: US 7,130,311 B2
(45) Date of Patent: Oct. 31, 2006

(54) ADAPTIVE DATA RATE CONTROL FOR MOBILE DATA TRANSFER

(75) Inventors: Mehmet Yavuz, Plano, TX (US); David Paranchych, Richardson, TX (US); Geng Wu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 983 days.

(21) Appl. No.: 10/034,086

(22) Filed: Dec. 28, 2001

(65) Prior Publication Data

US 2003/0123406 A1 Jul. 3, 2003

(51) Int. Cl.
*H04J 3/16* (2006.01)

(52) U.S. Cl. ............ 370/468; 370/437; 370/329; 455/450

(58) Field of Classification Search ............... None
See application file for complete search history.

(56) References Cited

U.S. PATENT DOCUMENTS

| | | | | |
|---|---|---|---|---|
| 5,857,147 A | * | 1/1999 | Gardner et al. | 455/67.11 |
| 6,067,646 A | * | 5/2000 | Starr | 714/701 |
| 6,272,652 B1 | * | 8/2001 | Starr | 714/704 |
| 6,408,037 B1 | * | 6/2002 | Gienger | 375/340 |
| 6,546,509 B1 | * | 4/2003 | Starr | 714/704 |
| 6,571,104 B1 | * | 5/2003 | Nanda et al. | 455/522 |
| 6,751,199 B1 | * | 6/2004 | Sindhushayana et al. | 370/252 |
| 6,791,954 B1 | * | 9/2004 | Cheng et al. | 370/311 |

FOREIGN PATENT DOCUMENTS

| | | |
|---|---|---|
| EP | 0767 548 A | 4/1997 |
| WO | WO 97/34439 A | 9/1997 |
| WO | WO 01/82521 A2 | 11/2001 |

OTHER PUBLICATIONS

Bender, Paul, et al; *CDMA/HDr: A Bandwith-Efficient High-Speed Wireless Data Service for Nomadic Users*; Jul. 2000, pp. 70-77, IEEE Communications Magazine.

Jalali, A, et al; *Data Throughput of CDMA-HDR A High Efficiency-High Data Rate Personal Communications Wireless System*; Qualcomm, Inc., San Diego, CA, USA.

* cited by examiner

*Primary Examiner*—Bob A. Phunkulh
(74) *Attorney, Agent, or Firm*—Trop, Pruner & Hu, P.C.

(57) ABSTRACT

A method and system applicable within a mobile transmission system for adaptively allocating a downlink data rate to an access terminal to compensate for channel fading. In accordance with the method of the present invention a downlink data rate selected in accordance with a determined signal-to-noise level, wherein the downlink data rate is associated with a specified signal-to-noise threshold to achieve a specified packet error rate. Next, a packet is transmitted to an access terminal at the selected downlink data rate. In response to successfully decoding the packet at the access terminal, the signal-to-noise threshold specified for the selected downlink data rate is decreased such that subsequent data rate selections are adaptively maximized. Responsive to a packet decoding error, the signal-to-noise threshold is abruptly increased to maintain the specified packet error rate.

14 Claims, 5 Drawing Sheets

| Data Rate [kbps] | Number of Slots [1 slot = 1.67ms] | Modulation Scheme | $E_c/I_0$ For 1% PER (dB) |
|---|---|---|---|
| 38.4 | 16 | QPSK | -13.5 |
| 76.8 | 8 | QPSK | -10.5 |
| 153.6 | 4 | QPSK | -7.4 |
| 307.2 | 2 | QPSK | -4.3 |
| 614.4 | 1 | QPSK | -1.0 |
| 307.2 | 4 | QPSK | -4.2 |
| 614.4 | 2 | QPSK | -1.2 |
| 1228.8 | 1 | QPSK | 3.7 |
| 921.6 | 2 | 8-PSK | 1.5 |
| 1843.2 | 1 | 8-PSK | 7.1 |
| 1228.8 | 2 | 16-QAM | 3.4 |
| 2457.6 | 1 | 16-QAM | 9.2 |

ADAPTIVE DATA RATE CONTROL FOR MOBILE DATA TRANSFER

BACKGROUND OF THE INVENTION

1. Technical Field

The present invention generally relates to mobile telecommunications, and in particular to a method and system for adaptively adjusting the downlink transmission rate to a mobile access terminal. More particularly, the present invention relates to a method and system that compensates for channel fading by periodically adjusting the downlink transmission rate in accordance with on-going packet error rate analysis.

2. Description of the Related Art

Mobile wireless access to the Internet and other communications networks is under rapid development. The development of mobile data communications capability is due to, and is modeled to some extent in light of, the success and advantages provided by the advent and development of mobile wireless telecommunications for voice communications. Several new air interface standards have been or are being developed to enable high speed wireless access to the Internet. These standards use fast feedback from a mobile terminal regarding channel conditions, which enable the downlink data rate to be quickly changed to compensate for signal fading. The technology used in these standards is generally known as high data rate (HDR) technology. One of these standards is referred to as 1xEV-DO, which has evolved into the industry standard IS-856.

HDR technology is typically implemented utilizing a combination of Code Division Multiple Access (CDMA) and Time Division Multiple Access (TDMA) technologies. In CDMA, all users transmit simultaneously over the entire allocated bandwidth utilizing specialized spreading codes. In TDMA, users take turns accessing the channel utilizing multiple time slots that are allocated for transmission over a given channel bandwidth. In this manner, TDMA enables a single frequency to support allocation of multiple, simultaneous data channels to access terminals. As utilized herein, an access terminal is a mobile device such as a laptop computer, palm-pilot, etc., that utilizes an air-interface to communicate with other terminals or network nodes via an access node, which is the air-interface network point-of-contact for any sending or receiving mobile terminal.

Existing HDR standards generally define two groups of channels, the forward channel (referred to hereinafter as the downlink channel) and the reverse channel (referred to hereinafter as the uplink channel). The downlink channel, which communicates voice and data from the access node to mobile access terminals, carries traffic, a pilot signal, and overhead information. The pilot and overhead channels establish system timing and station identity. The uplink channel, which communicates voice and data from the access terminal to the access node, carries both traffic and signaling.

Unlike voice or two-way multi-media sessions, "data" sessions (e.g. Internet file downloads) are highly asymmetrical, with the downlink (i.e. the channel information transmitted from the access node to the access terminal) capacity being a disproportionately critical parameter. On the downlink of an HDR system, data may be transmitted in a time division multiplexed manner. The downlink capacity in HDR systems is measured, at least in part, in terms of the data rate allocated to the access terminal. In HDR implementations, interference caused by signals from other cells is a determinative factor in the allocation of a particular data rate to a given access terminal. Excessive signal interference can cause a failure in decoding a packet delivered from the access node to the access terminal. Such a failure results in the need to re-transmit the packet, resulting in a diminished data transmission efficiency. Therefore, downlink data rate selection is a key parameter in maintaining the efficiency of a given HDR channel.

The various 3GPP and 3GPP2 HDR standards, which use time division multiplexing of the downlink (HSDPA and 1xEV-DO, for example), require methods for determining the appropriate data rate allocated to an access terminal downlink. Generally, this requires that the access terminal perform a measurement of the current channel conditions in terms of the signal-to-interference-plus-noise ratio (SINR), which is a ratio of the energy-per-chip interval ($E_c$) of the allocated channel to the outside spectral interference ($I_o$). In 1xEV-DO, once the SINR is measured, the access terminal must update the access network with data rate control (DRC) requests that map to a set of data rates in bits-per-second (bps). It is the responsibility of the access terminal to select a data rate appropriate to the received SINR, such that the resultant packet error rate (PER) falls within certain limits specified in the applicable standard. In 1xEV-DO, the access node subsequently transmits data to the access terminal at the data rate specified by the DRC request. Therefore, in 1xEV-DO the data rate selection function typically resides in the access terminal. Once the access node has received the DRC request and determined that the access terminal should receive a packet, the access node transmits the packet over one or more time slots in accordance with the requested DRC rate.

Channel fading is a major source of channel signal strength fluctuations. So-called "slow fading" is caused by movement of the access terminal with respect to the access node (typically an RF transceiver station) resulting in interference in the air interface path between the access terminal and Access node due to changing physical topology (buildings, power lines, etc.). "Fast fading" is a phenomenon associated with collisions of multiple versions of the transmitted signal that arrive at the receiver at slightly different times and is typically characterized in terms of Doppler Effect and Rayleigh fading factors. HDR technology may account for channel fading by providing a built-in error factor into the downlink DRC request such that the data rate requested is a product of a very conservative estimate. Implementation of a downlink data rate based on such a conservative estimate results in wasted RF resources and reduced throughput. Alternatively, channel fading can be accounted for directly by modeling and predictively estimating the channel fading that will occur for a given nomadic access terminal. Companies that provide wireless mobile communications are adopting ray tracing and Doppler Effect tools that attempt to compute the effects of channel fading in a complicated environment. Such methods present daunting computational objectives which require substantial and costly hardware and software overhead since these methods directly or indirectly must account for access terminal speed, access terminal location within a given sector (with respect to an access node), and line-of-sight information between the access terminal and the access node.

It can therefore be appreciated that a need exists for an improved approach to compensating for channel fading in the allocation of downlink channels in a mobile wireless environment. The present invention addresses such a need.

SUMMARY OF THE INVENTION

A method and system applicable within a mobile transmission system for adaptively allocating a downlink data rate to an access terminal to compensate for channel fading are disclosed herein. In accordance with the method of the present invention a downlink data rate selected in accordance with a determined signal-to-noise level, wherein the downlink data rate is associated with a specified signal-to-noise threshold to achieve a specified packet error rate. Next, a packet is transmitted to an access terminal at the selected downlink data rate. In response to successfully decoding the packet at the access terminal, the signal-to-noise threshold specified for the selected downlink data rate is decreased such that subsequent data rate selections are adaptively maximized. Responsive to a packet decoding error, the signal-to-noise threshold is abruptly increased to maintain the specified packet error rate. Such a method enables maximization of data throughput while observing a specified packet error rate.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

This invention is described in a preferred embodiment in the following description with reference to the figures. While this invention is described in terms of the best mode for achieving this invention's objectives, it will be appreciated by those skilled in the art that variations may be accomplished in view of these teachings without deviating from the spirit or scope of the present invention. Although, the present invention will be described herein in terms of a particular system and particular components, one of ordinary skill in the art will readily recognize that this method and system will operate effectively for other components in a data processing system.

Figure 1:
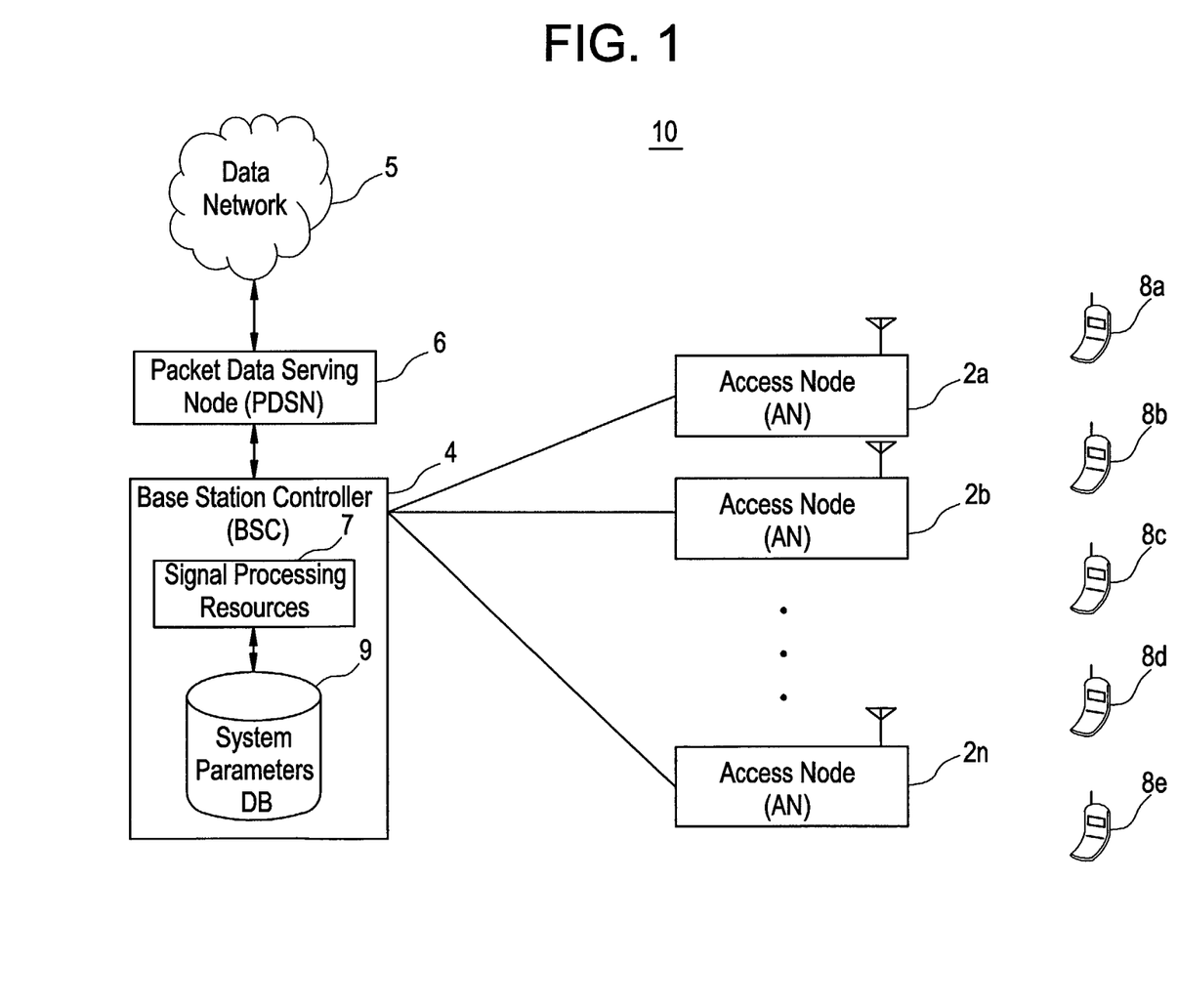
FIG. 1 depicts an illustrative embodiment of a wireless communication network with which the method and system of the present invention may advantageously be utilized.

Referring now to the drawings and in particular to FIG. 1, there is depicted a high-level diagram of a wireless communication network 10 in which a preferred embodiment of the present invention may advantageously be implemented. Wireless communication network 10 preferably employs a mobile air-interface digital protocol such as 1xEV-DO. As shown, wireless communication network 10 includes a packet data serving node (PDSN) 6 that supports various packet data session functions for a multiple-access technology such as 1xEV-DO, as well as connectivity to a packet switched data network (PSDN) 5, an example of which in the Internet.

Coupled to PDSN 6 is a base station controller (BSC) 4 that generally comprises signal processing resources 7, which may be implemented as one or more mid-range computer systems, and a system parameters database 9. BSC 4 controls the operation of several base transceiver stations, referred to herein generically as access nodes 2a–2n distributed at various locations within wireless communication network 10 in accordance with the system parameters stored in system parameters database 9. Within the service area of wireless communication network 10, there are also several mobile stations (referred to hereinafter as mobile access terminals) such as mobile access terminals 8a, 8b, 8c, 8d and 8e, which transmit and receive calls, pages, data and control messages over-the-air with access nodes 2a–2n. Although the present invention is described below with reference to mobile access terminals 8, those skilled in the art will appreciate from the following description that the present invention is also applicable to wireless local loop (WLL) implementations in which the subscriber units are generally fixed in a residence or business premises.

Figure 2:
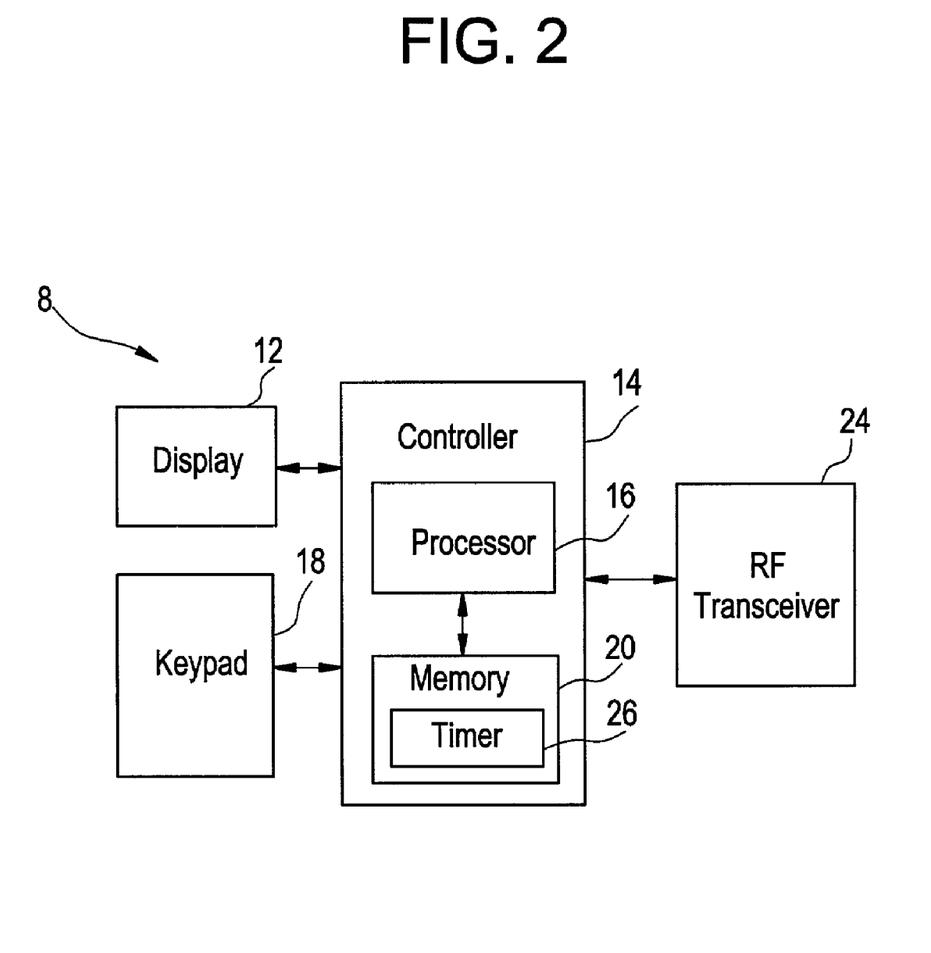
FIG. 2 is a high-level block diagram of an mobile access terminal that may be utilized in implementing the present invention.

Referring to FIG. 2, there is illustrated a high-level block diagram of a mobile access terminal 8 or other subscriber unit that may be utilized to implement the downlink data rate control method of the present invention. Mobile access terminal 8 includes a controller 14 that generally includes a processor 16 and a memory 20. Processor 16 executes a control program stored within memory 20 to implement the subscriber unit side of the downlink data rate control method employed by wireless communication network 10. Mobile access terminal 8 also has a keypad 18 by which the subscriber can enter keyed inputs, and a display 12 through which controller 14 can visually present alphanumeric and graphical outputs for viewing by the subscriber. Finally, mobile access terminal 8 includes a radio frequency transceiver 24 for sending (on an uplink channel) and receiving (on a downlink channel) wireless signals, including data messages, over-the-air.

Referring back to FIG. 1, BSC 4, in conjunction with access nodes 2a–2n, allocates downlink channels, which communicate data from access nodes 2a–2n to mobile access terminals 8a, 8b, 8c, 8d and 8e. Such downlink channels may carry traffic, a pilot signal, and overhead information. The pilot and overhead channels establish system timing and station identity. Pilot channel Abursts@ are typically utilized as a signal strength reference that enables mobile access terminal 8 to estimate relevant channel conditions. In accordance with the embodiments depicted by the figures herein, a mobile access terminal may utilize the pilot burst to resolve the multipath components into an estimate of the signal-to-interference-plus-noise ratio (SINR) in terms of the signal energy ($E_c$) to RF interference ($I_o$).

Reverse, or "uplink" channels, are utilized to communicate data from mobile access terminals 8a, 8b, 8c, 8d and 8e to access nodes 2a–2n, and, like the downlink channels, carry both traffic and signaling. After sampling a pilot channel burst from a base transceiver station, the mobile access terminal estimates the current SINR conditions and delivers channel state information in the form of a data rate request to the base transceiver station utilizing an uplink data rate control (DRC) channel.

A recently developed mobile data communications capability for use within mobile network environments, such as wireless communication network 10, is known as high data rate (HDR) service with time division multiplexing coding techniques such as TDMA. Current HDR implementations utilize selectable DRC sets that provide the mobile access terminal with a tabularized selection criteria by which a downlink data rate is selected. In a fading channel environment, the necessary SINR threshold increases (with respect to static Additive Wide Gaussian Noise conditions) to maintained a specified PER. The present invention provides an efficient means by which a mobile access terminal can effectively map the received SINR measurement to a DRC rate option in a manner that maximizes allocated downlink bandwidth while maintaining the requisite PER in a fading channel environment.

As explained in further detail with reference to FIGS. 3, 4, and 5, the method and system of the present invention are applicable within mobile communication system 10 and mobile access terminal 8 to provide a means for efficiently allocating and dynamically adjusting a downlink data rate in view of periodic SINR estimates performed by mobile access terminal 8. In particular, the present invention is directed to improving downlink channel bandwidth allocation for high speed packet-based data transmission in a mobile environment such as that depicted in FIG. 1.

Figure 3:
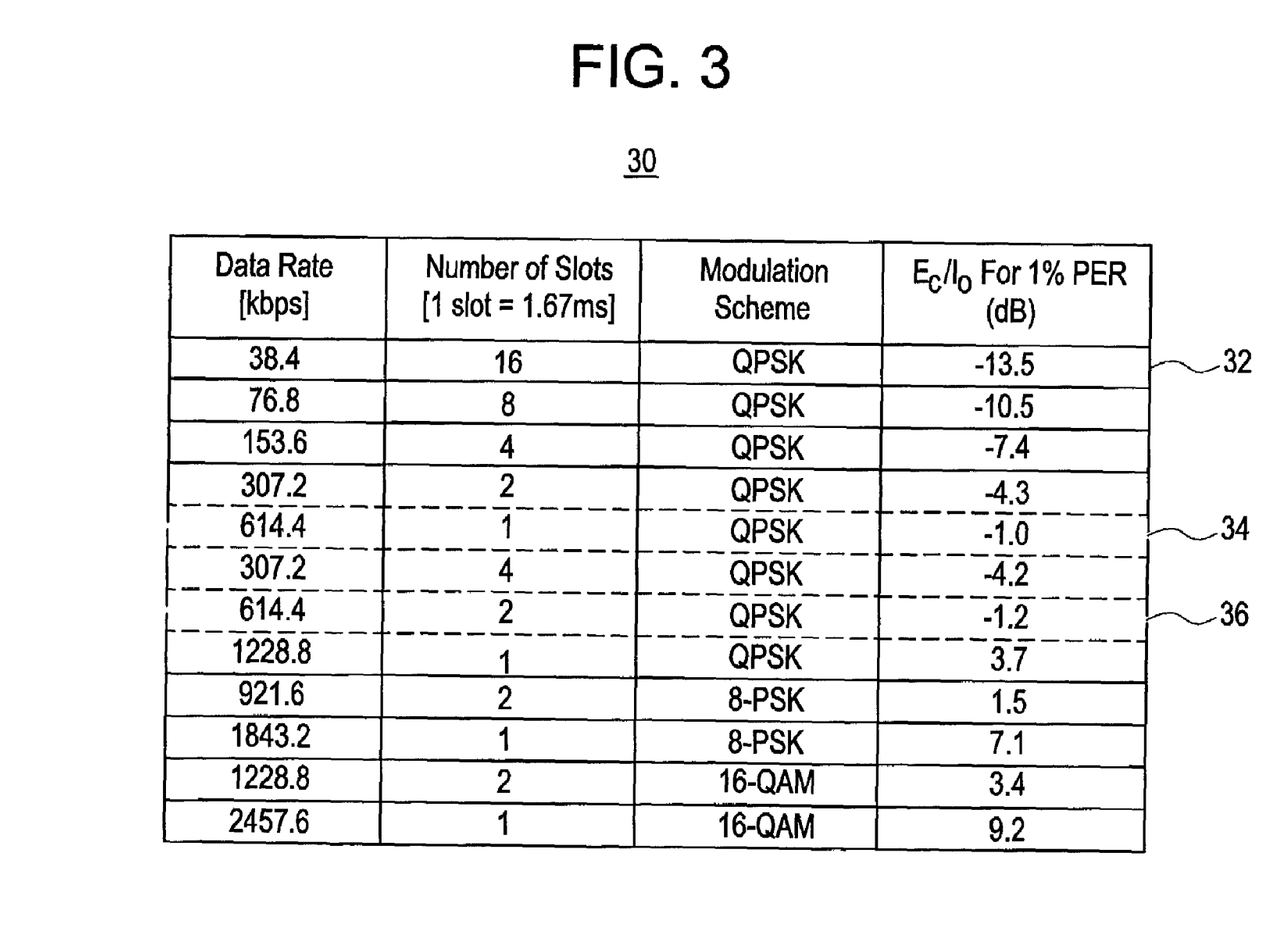
FIG. 3 illustrates an exemplary data rate control table consisting of multiple data rate control sets that are selected and dynamically adjusted in accordance with the present invention.

With reference to FIG. 3, there is illustrated an exemplary data rate control table consisting of multiple data rate control sets that are selected and dynamically adjusted in accordance with the present invention. Specifically, a DRC table 30 is depicted which includes twelve selectable DRC sets. As shown in FIG. 3, each DRC set includes a specified data rate (in kbps) associated with a particular SINR, expressed as an $E_c/I_o$ threshold, that is required to achieve a specified packet error rate (PER) of 1% for AWGN channel conditions. For example, the lowest selectable data rate (38.4 kbps) within DRC table 30 is associated with the lowest $E_c/I_o$ threshold (−13.5 dB) within a discrete DRC set 32 to meet the 1% PER requirement. Modulation scheme and number of time slots are also included as metric guidelines and limitations within each DRC set. The inclusion of time slot specification within DRC table 30 is a reflection of the nature of current HDR implementations in which the HDR downlink transmissions are time-multiplexed. Although the depicted DRC sets include slot number and modulation scheme metrics, it should be borne in mind that the present invention can be implemented in a much simpler tabular association between only selectable data rates and $E_c/I_o$ thresholds. It should be further noted that the particular values depicted in DRC table 30 correspond to static AWGN channel conditions (as set in initializing a channel, for example). As explained in further detail hereinbelow, the present invention enables optimum selection and adaptive adjustment of the threshold data sets within a DRC table such as DRC table 30.

DRC table 30 may be utilized in downlink data rate allocation as part of a standardized DRC mechanism. One such mechanism, 1xEV-DO, is a newly developing wireless standard based on HDR technology and is optimized for wireless Internet services. In accordance with current HDR/DRC technology, an access terminal selects from among the available data rates within DRC table 30 by comparing measured channel conditions to the $E_c/I_o$ threshold values provided in DRC table 30 and selecting one of the DRC sets accordingly. Although DRC table 30 may typically be included within memory 20 of mobile access terminal 8, it is possible to maintain the DRC table within access nodes 2a–2n or BSC 4. The methods by which the DRC sets are selected and dynamically adjusted are described in further detail with reference to FIGS. 4 and 5 below.

Figure 4:
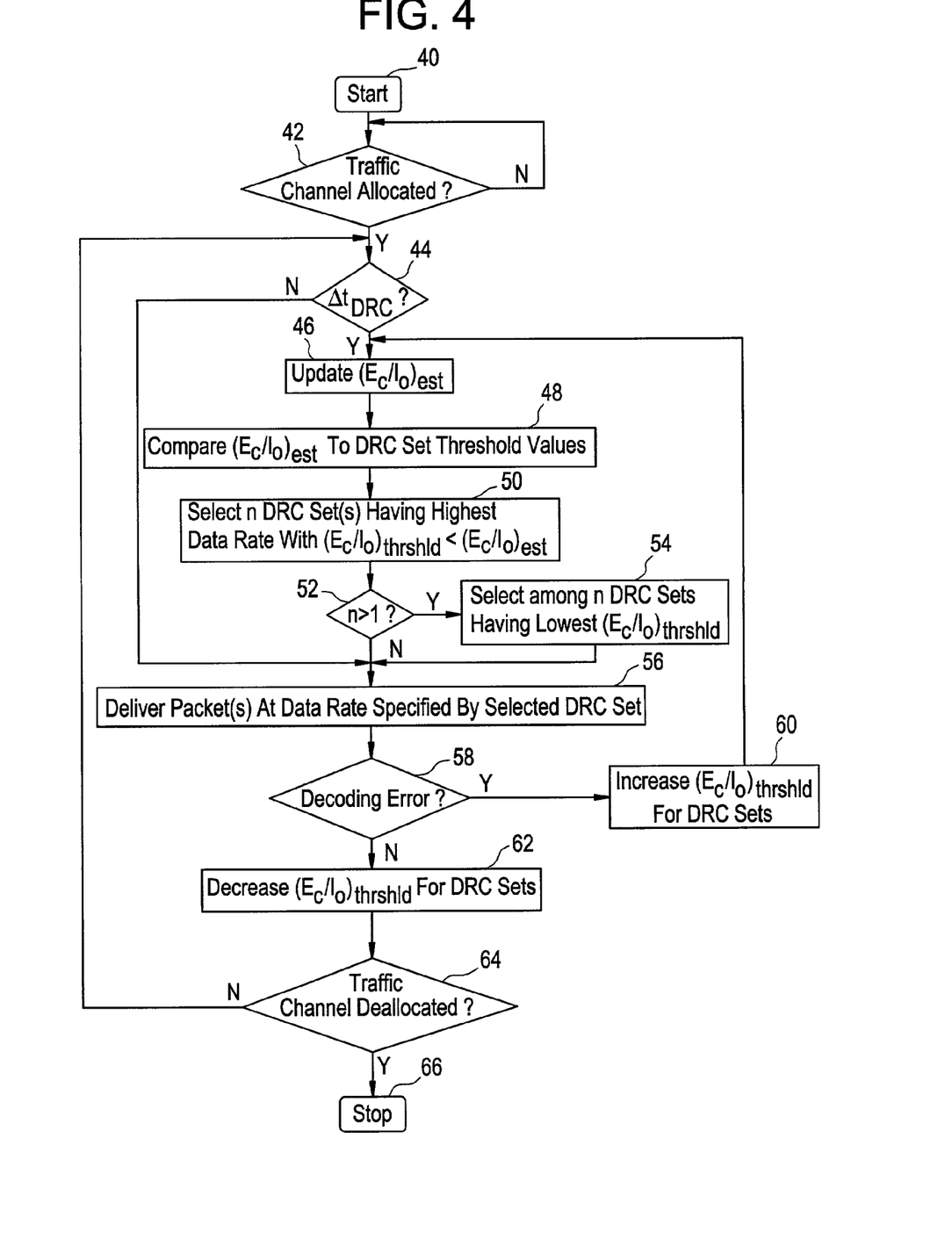
FIG. 4 is a flow diagram depicting steps performed during adaptive allocation of a downlink data rate in accordance with a preferred embodiment of the present invention.

With reference now to FIG. 4, there is depicted a flow diagram illustrating steps performed by processor 16 contained within mobile access terminal 8 and/or signal processing resources 7, during adaptive allocation of a downlink data rate in accordance with a preferred embodiment of the present invention. The downlink data rate allocation process begins as shown at step 40, and proceeds to step 42 with a determination of whether a downlink traffic channel has been allocated by BSC 4 to mobile access terminal 8 via access node 2. As illustrated at steps 44 and 46, while a downlink traffic channel is allocated, a periodic SINR estimate is performed by mobile access terminal 8 at a specified interval, $\Delta t_{DRC}$. This estimate is followed by a DRC request that is formulated in accordance with the remaining steps in the process.

Although not expressly depicted in FIG. 4, the values within each of the DRC sets within DRC table 30 are initialized to pre-specified values (static AWGN, for example). The data rate control mechanism described with reference to FIGS. 4 and 5 enables a mobile access terminal to select among the DRC sets within a DRC table, and furthermore to adaptively adjust DRC set parameters to account for changing channel conditions such as channel fading without unduly limiting the allocated downlink bandwidth.

Continuing with FIG. 4, following the SINR update at step 46, mobile access terminal 8 compares the estimated SINR to the DRC sets contained within DRC table 30 (step 48), and, as depicted at step 50, preliminarily selects one or more DRC sets that share a maximum data rate value that is associated within their respective sets with SINR thresholds (i.e. $E_c/I_o$ thresholds) that are less than the SINR estimation obtained at step 46. Referring back to FIG. 3 for example, if the estimated SINR value is 0 dB, the preliminarily eligible DRC sets would consist of DRC sets 34 and 36, which share a maximum data rate (614.4 kbps) for DRC sets having SINR thresholds below 0 dB. If, as illustrated at steps 52 and 54, more than one DRC set with SINR thresholds less than the estimated SINR share the maximum data rate value, the set with the lowest SINR threshold is finally selected in the DRC request that is then delivered from mobile access terminal 8 to access node 2. Returning to the above example, DRC set 36 would be selected since its SINR threshold of −1.2 dB is lower than the −1.0 dB SINR threshold for DRC set 34. As previously explained, the particular values depicted in DRC table 30 reflect only a single snapshot of DRC set thresholds (for static AWGN conditions), and as explained with reference to FIGS. 4 and 5, the SINR threshold values for each of the DRC sets within DRC table 30 are dynamically adjusted to account for fading channel conditions.

During each DRC interval, packets are transmitted on the allocated downlink air-channel in accordance with the values specified in the selected DRC set as depicted at step 56. As illustrated at steps 58 and 60, in the case of an unsuccessful packet transmission (i.e. mobile access terminal 8 is unable to successfully decode the packet), the SINR thresholds specified within DRC table 30 are increased to maintain the specified PER. Conversely, as depicted at steps 58 and 62, for each packet that is successfully transmitted to mobile access terminal 8, the SINR thresholds specified within DRC table 30 are decreased to maximize the available data rate bandwidth while maintaining the specified PER under fading channel conditions.

The selection of a particular DRC set (performed in accordance with steps 44, 46, 48, 50, 52, and 54), the transmission of packets (step 56), and the subsequent SINR threshold adjustments continue until the downlink traffic channel is deallocated at step 64, terminating the process as shown at step 66. It should be noted that although the SINR thresholds are adjusted during a given data session, the initial values (such as those depicted in FIG. 3) are maintained in memory and restored as initialization values upon a subsequent channel allocation to mobile access terminal 8.

Figure 5:
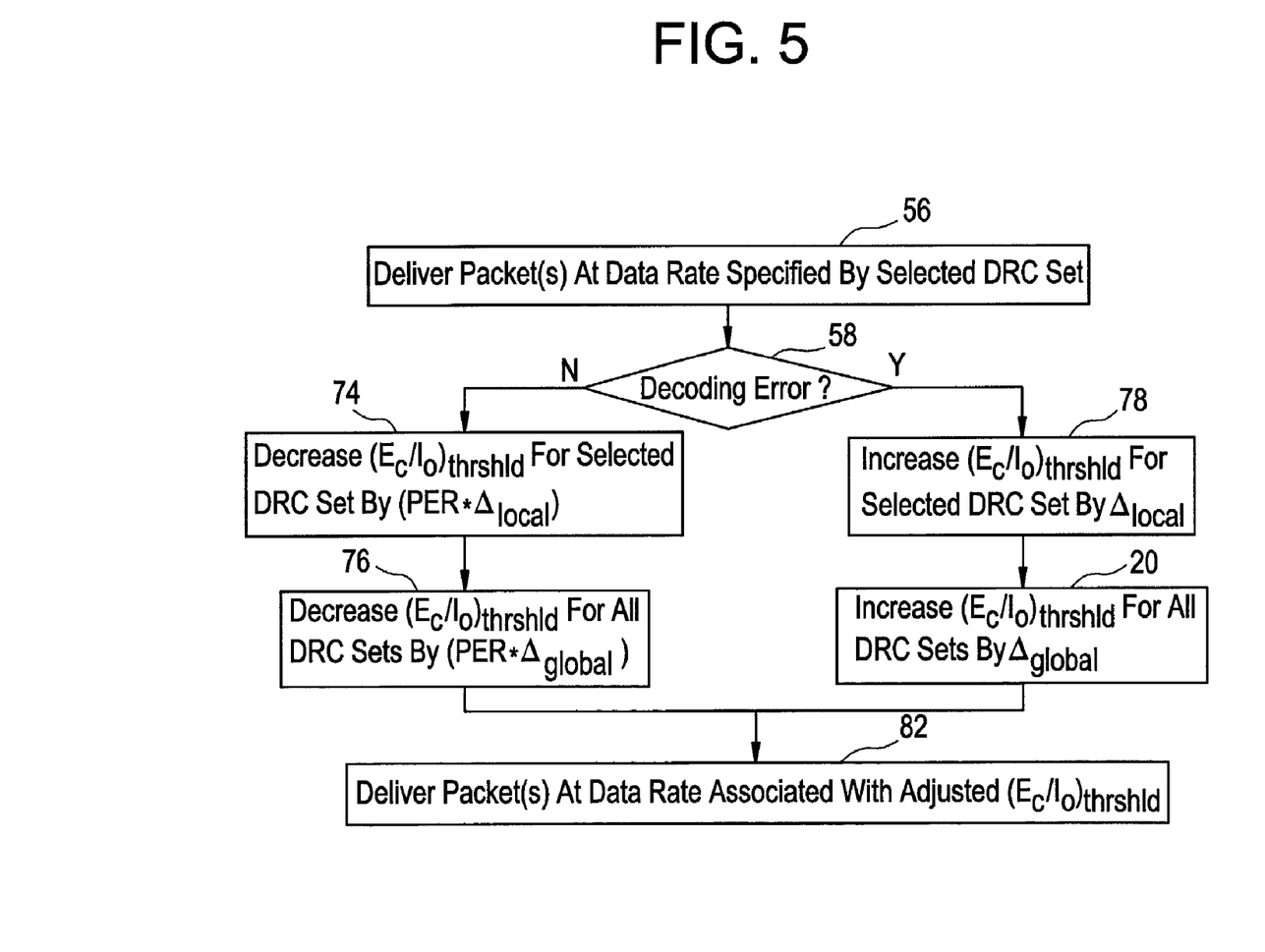
FIG. 5 is a flow diagram illustrating the process of adaptively adjusting signal-to-noise thresholds that are associated with selectable downlink data rates in accordance with a preferred embodiment of the present invention.

With reference now to FIG. 5, there is depicted a flow diagram illustrating more detailed steps for adaptively adjusting SINR thresholds that are associated with selectable downlink data rates in accordance with a preferred embodiment of the present invention. As explained with reference to steps 58 and 62 of FIG. 4, in order to maximize the realizable downlink bandwidth for a given downlink channel, the present invention decreases the SINR thresholds for the DRC sets within DRC table 30, such that upon a next DRC request interval, the selected data rate will be statistically higher for a given measured SINR. However, in light of the need to maintain a specified PER under fading channel conditions, such downward SINR threshold adjustments cannot be maintained perpetually. Therefore, as illustrated at steps 58 and 60 of FIG. 4, the DRC set SINR thresholds are upwardly adjusted in response to a packet error.

The process steps explained with reference to FIG. 5 provide an efficient mechanism by which the relative SINR threshold increment and decrement values are determined locally (i.e. with respect to the selected DRC) and globally (i.e. with respect to all DRC sets within the DRC table). As shown in FIG. 5, the process begins with packet transmission, and a determination of whether or not the transmitted packet was successfully decoded (steps 56 and 58). In response to a successful packet transmission, and as depicted at step 74, the SINR threshold for the currently selected $j^{th}$ DRC set is decremented in accordance with the relation:

$$T=T_j-(PER*\Delta_{local})$$

wherein T represents the decreased SINR threshold value associated with the data rate value contained within the selected DRC set, $T_j$ represents the current SINR threshold value associated with the selected DRC set, PER represents the specified packet error rate for the DRC table, and $\Delta_{local}$ represents a local data rate control delta value. It should be noted that another decrement factor aside from PER can be utilized in the SINR threshold reduction computation without departing from the spirit or scope of the present invention. It is important, however, that the SINR threshold reduction computation include a decrement value that is a relatively small fraction of the SINR threshold increment value (depicted with reference to steps 78 and 80) to provide a relatively gradual downward adjustment of the SINR thresholds in comparison to the relatively abrupt increase (re-adjustment) of the thresholds in response to a packet decoding error.

In further response to a successful packet transmission, and as depicted at step 76, the SINR thresholds for all DRC sets within the DRC table are decremented in accordance with the relation:

$$T=T_i-(PER*\Delta_{global}) \text{ for } i=1, 2, \ldots N$$

wherein T represents the decreased SINR threshold, $T_i$ represents the $i^{th}$ SINR threshold value within the DRC table, PER represents the specified packet error rate, $\Delta_{global}$ represents a global data rate control delta value, and N represents the total number of DRC sets within the DRC table.

The processing of decreasing the SINR threshold values that are each associated with a given data rate within each of the DRC sets continues in response to successful packet transmission until a packet decoding failure occurs, whereupon as depicted at step 78, the SINR threshold for the currently selected $j^{th}$ DRC set is increased in accordance with the relation:

$$T=T_j+\Delta_{local}$$

wherein T represents the increased SINR threshold associated with the downlink data rate contained within the selected DRC set, $T_j$ represents the current SINR threshold value associated with the selected downlink data rate, and $\Delta_{local}$ represents a local data rate control delta value.

In further response to a packet decoding error, and as depicted at step 80, the SINR thresholds for all DRC sets within the DRC table are increased in accordance with the relation:

$$T=T_i+\Delta_{global} \text{ for } i=1, 2, \ldots N$$

wherein T represents the increased value for the $i^{th}$ SINR threshold value among the SINR threshold values within the DRC table, $T_i$ represents current value for the $i^{th}$ SINR threshold value among the SINR threshold values within the DRC table, PER represents the specified packet error rate, $\Delta_{global}$ represents a global data rate control delta value, and N represents the total number of DRC sets within the DRC table. Responsive to either an increase or decrease in the SINR threshold values with the DRC table, the adaptive threshold adjustment process is terminated and subsequent packets are delivered from the object mobile access terminal at a downlink data rate associated with the adjusted SINR threshold.

It should be noted that the relatively small decrement steps (as determined by multiplying the desired PER by the local or global delta value) will result in a gradual maximization of allocated downlink bandwidth. The relatively large threshold re-adjustment performed in response to an unsuccessful transmission is designed to immediately restore the fidelity of the channel.

A method and system have been disclosed for adaptively selecting and adjusting data rate control parameters within a mobile data transfer system. Software written according to the present invention is to be stored in some form of computer-readable medium, such as memory, CD-ROM or transmitted over a network, and executed by a processor. Alternatively, some or all of the present invention could be implemented in hardware. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method applicable within a mobile communication system for adaptively allocating a downlink data rate to an access terminal to compensate for channel fading, said method comprising:

selecting a downlink data rate in accordance with a determined signal-to-noise level, wherein said downlink data rate is associated with a specified signal-to-noise threshold value to achieve a specified packet error rate, wherein selecting the downlink data rate comprises:

comparing said determined signal-to-noise level with a plurality of signal-to-noise threshold values, wherein each of said plurality of signal-to-noise threshold values is associated with a downlink data rate; and selecting a highest downlink data rate corresponding to two or more of said plurality of signal-to-noise threshold values that do not exceed said determined signal-to-noise level, wherein said mobile communication system includes selectable data rate control sets in which each of said plurality of signal-to-noise threshold values is associated with a corresponding downlink data rate for said specified packet error rate, and wherein selecting the highest downlink rate comprises:

comparing the relative values of said two or more signal-to-noise threshold values; and selecting a data rate control set corresponding to the lowest among said two or more signal-to-noise threshold values;

receiving a packet by the access terminal at said selected downlink data rate;

responsive to successfully decoding said packet, decreasing the signal-to-noise threshold value specified for said selected downlink data rate; and responsive to unsuccessfully decoding said packet, increasing the signal-to-noise threshold value specified for said selected downlink data rate, said increasing the signal-to noise threshold value specified for said selected downlink data rate comprising:

computing an increased signal-to-noise threshold value specified for said selected downlink data rate in accordance with the relation:

$$T = T_j + \Delta_{local}$$

wherein T represents the increased signal-to-noise threshold value associated with the selected downlink data rate, $T_j$ represents the current signal-to-noise threshold value associated with the selected downlink data rate, and $\Delta_{local}$ represents a local data rate control delta value.

2. The method of claim 1, wherein said determined signal-to-noise level at said access terminal is a ratio of the signal strength of an allocated access terminal channel to the combined external signal strength.

3. The method of claim 1, wherein said selecting a downlink data rate is preceded by determining a signal-to-noise level at said access terminal.

4. The method of claim 1, further comprising:

responsive to unsuccessfully decoding said packet, increasing each of said plurality of signal-to-noise threshold values in accordance with the relation:

$$T = T_i + \Delta_{global}$$

wherein T represents the increased value for the $i^{th}$ signal-to-noise threshold value among said plurality of signal-to-noise threshold values, $T_i$ represents current value for the $i^{th}$ signal-to-noise threshold value among said plurality of signal-to-noise threshold values, and $\Delta_{global}$ represents a global data rate control delta value.

5. A method applicable within a mobile communication system for adaptively allocating a downlink data rate to a mobile access terminal to compensate for channel fading, said method comprising:

selecting, by the mobile access terminal, a downlink data rate in accordance with a determined signal-to-noise level, wherein said downlink data rate is associated with a specified signal-to-noise threshold value to achieve a specified packet error rate;

receiving a packet by the mobile access terminal at said selected downlink data rate; and responsive to successfully decoding said packet, the mobile access terminal decreasing the signal-to-noise threshold value specified for said selected downlink data rate, said decreasing the signal-to-noise threshold value specified for said selected downlink data rate comprising:

computing a decreased signal-to-noise threshold value specified for said selected downlink data rate in accordance with the relation:

$$T = T_j - (PER * \Delta_{local})$$

wherein T represents the decreased signal-to-noise threshold value associated with the selected downlink data rate, $T_j$ represents the current signal-to-noise threshold value associated with the selected downlink data rate, PER represents said specified packet error rate, and $\Delta_{local}$ represents a local data rate control delta value.

6. The method of claim 5, wherein said mobile communication system includes selectable data rate control sets in which each of said plurality of signal-to-noise threshold values is associated with a corresponding downlink data rate for said specified packet error rate, said method further comprising:

responsive to successfully decoding said packet, decreasing each of said plurality of signal-to-noise threshold values in accordance with the relation:

$$T = T_i - (PER * \Delta_{local})$$

wherein T represents the decreased signal-to-noise threshold, $T_i$ represents the $i^{th}$ signal-to-noise threshold value among said plurality of signal-to-noise values, PER represents said specified packet error rate, and $\Delta_{global}$ represents a global data rate control delta value.

7. The method of claim 5, further comprising responsive to unsuccessfully decoding the packet, increasing the signal-to-noise threshold value specified for the selected downlink data rate.

8. A mobile communication system for adaptively allocating a downlink data rate to an access terminal to compensate for channel fading, said mobile communication system comprising:

processing means for selecting a downlink data rate in accordance with a determined signal-to-noise level, wherein said downlink data rate is associated with a specified signal-to-noise threshold value to achieve a specified packet error rate, wherein said processing means for selecting a downlink data rate comprises:

processing means for comparing said determined signal-to-noise level with a plurality of signal-to-noise threshold values, wherein each of said plurality of signal-to-noise threshold values is associated with a downlink data rate; and processing means for selecting a highest downlink data rate corresponding to two or more of said plurality of signal-to-noise threshold values that do not exceed said determined signal-to-noise level;

memory containing selectable data rate control sets in which each of said plurality of signal-to-noise threshold values is associated with a corresponding downlink data rate for said specified packet error rate;

wherein said processing means for selecting the highest downlink data rate comprises:

processing means for comparing the relative values of said two or more signal-to-noise threshold values; and processing means for selecting a data rate control set corresponding to the lowest among said two or more signal-to-noise threshold values;

air-interface transmission means for transmitting a packet to an access terminal at said selected downlink data rate;

processing means responsive to successfully decoding said packet for decreasing the signal-to-noise threshold specified for said selected downlink data rate; and processing means responsive to unsuccessfully decoding said packet for increasing the signal-to-noise threshold specified for said selected downlink data rate, said processing means for increasing the signal-to-noise threshold specified for said selected downlink data rate comprising:

processing means for computing an increased signal-to-noise threshold specified for said selected downlink data rate in accordance with the relation:

$$T=T_j-\Delta_{local}$$

wherein T represents the increased signal-to-noise threshold associated with the selected downlink data rate, $T_j$ represents the current signal-to-noise threshold value associated with the selected downlink data rate, and $\Delta_{local}$ represents a local data rate control delta value.

9. The mobile communication system of claim 8, wherein said determined signal-to-noise level at said access terminal is a ratio of the signal strength of a pilot channel to the combined external signal strength.

10. The mobile communication system of claim 8, further comprising signal detection and processing means for determining a signal-to-noise level at each access terminal.

11. The mobile communication system of claim 8, further comprising:

processing means responsive to unsuccessfully decoding said packet for increasing each of said plurality of signal-to-noise threshold values in accordance with the relation:

$$T=T_i+\Delta_{global}$$

wherein T represents the increased value for the $i^{th}$ signal-to-noise threshold value among said plurality of signal-to-noise threshold values, $T_i$ represents current value for the $i^{th}$ signal-to-noise threshold value among said plurality of signal-to-noise threshold values, and $\Delta_{global}$ represents a global data rate control delta value.

12. A mobile access terminal comprising:

processor to select a downlink data rate in accordance with a determined signal-to-noise level, wherein said downlink data rate is associated with a specified signal-to-noise threshold value to achieve a specified packet error rate;

the processor to send a data rate request containing the selected downlink data rate to an access node over an uplink channel;

air-interface transceiver to receive a packet from the access node at said selected downlink data rate; and the processor responsive to successfully decoding said packet to decrease the signal-to-noise threshold value specified for said selected downlink data rate, wherein the signal-to-noise threshold value specified for said selected downlink data rate is decreased by:

computing a decreased signal-to-noise threshold value specified for said selected downlink data rate in accordance with the relation:

$$T=T_j-(PER*\Delta_{local})$$

wherein T represents the decreased signal-to-noise threshold value associated with the selected downlink data rate, $T_j$ represents the current signal-to-noise threshold value associated with the selected downlink data rate, PER represents said specified packet error rate, and $\Delta_{local}$ represents a local data rate control delta value.

13. The mobile access terminal of claim 12, further comprising memory for storing selectable data rate control sets in which each of said plurality of signal-to-noise threshold values is associated with a corresponding downlink data rate for said specified packet error rate, the processor responsive to successfully decoding said packet to decrease each of said plurality of signal-to-noise threshold values in accordance with the relation:

$$T=T_j-(PER*\Delta_{local})$$

wherein T represents the decreased signal-to-noise threshold, $T_i$ represents the $i^{th}$ signal-to-noise threshold value among said plurality of signal-to-noise threshold values, PER represents said specified packet error rate, and $\Delta_{global}$ represents a global data rate control delta value.

14. The mobile access terminal of claim 12, the processor responsive to unsuccessfully decoding the packet to increase the signal-to-noise threshold value specified for the selected downlink data rate.

* * * * *